A. DECHY.
SPLASH PREVENTER FOR ROAD VEHICLES.
APPLICATION FILED AUG. 5, 1913.
1,142,680.
Patented June 8, 1915.
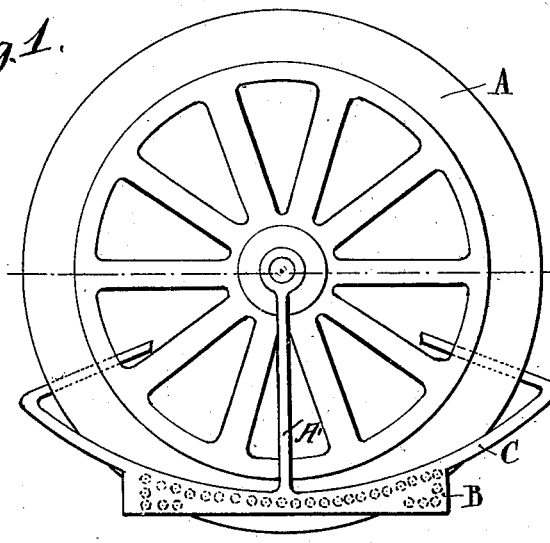
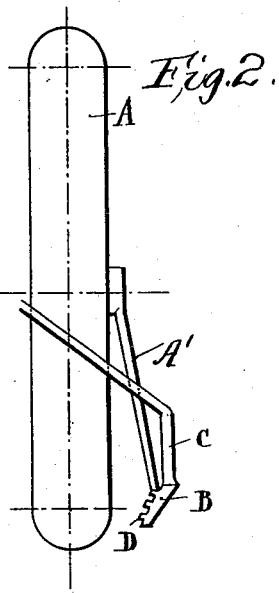
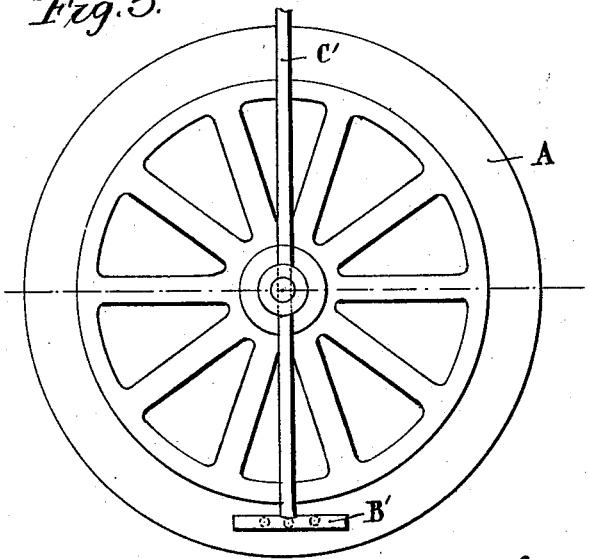

UNITED STATES PATENT OFFICE.

ABEL DECHY, OF PARIS, FRANCE.

SPLASH-PREVENTER FOR ROAD-VEHICLES.

1,142,680.  Specification of Letters Patent.  Patented June 8, 1915.

Application filed August 5, 1913. Serial No. 783,210.

*To all whom it may concern:*

Be it known that I, ABEL DECHY, a resident of Paris, in the Republic of France, have invented certain new and useful Improvements in Splash-Preventers for Road-Vehicles, of which the following is a specification.

The present invention has for its object to provide a simple splash preventing device applicable to road vehicles and designed to prevent the lateral splash of mud thrown with more or less force from the wheels as they pass through puddles of water.

In carrying out the invention any desired arrangement may be employed which accomplishes the function hereinafter set forth and as illustrated in the drawing a preferred embodiment of the device will be described.

Figure 1 is a side elevation of a device constructed in accordance with this invention and applied to a vehicle wheel. Fig. 2 is an end elevation of the same, and Fig. 3 is a side elevation showing a slightly modified form.

It is comprehended by my invention to employ a nozzle which is arranged at one side of a vehicle wheel at a point contiguous to the ground surface, the nozzle being supported from the wheel axle and having connected therewith conduits leading from a suitable source of compressed air.

The essential feature of my device is the disposition of the nozzle at a point directly in alinement with the path of travel of mud thrown laterally from the wheel in such a manner that the air issuing from said nozzle moves in a directly opposite direction to the direction of passage of the mud with the result that the jets of mud are caused to be broken off nearly level with the ground.

Specifically describing the device, the character A designates a vehicle wheel from the axle of which is suspended, by means of an arm A', a casing B having communicating therewith one or more conduits C which lead to a suitable source of compressed air preferably controlled by the engine so as to supply air, the force of which is proportionate to the speed at which the vehicle is traveling. The casing B is provided with a plurality of nozzles D from which the air is projected in a path directly opposite to the jets of mud thrown laterally from the wheel.

In Fig. 3 I have shown a modified arrangement of the device wherein the conduit C' leads to the source of compressed air which conduit is supported intermediate its length upon the wheel axle and terminates at its lower end in the nozzle B' disposed at a point as described with reference to the preferred embodiment.

Having thus described my invention, what I claim as new is:

In a device of the class described, the combination with a vehicle wheel and axle therefor, of a casing disposed at one side of the wheel adjacent the supporting surface for said wheel, said casing having a series of openings formed laterally thereof directed toward the wheel and arranged to conform to the curvature of the same, a conduit for supplying said casing with air under pressure whereby to project a thin stream of air in a path opposite to the path of travel of mud splashed laterally by the wheel aforesaid, and a vertically disposed arm connected centrally of the casing and suspending said casing from the axle of the wheel at the position aforesaid.

In witness whereof I have hereunto signed my name in the presence of two subscribing witnesses, this 22d day of July, 1913.

ABEL DECHY.

Witnesses:
 ANTONIN MONTEILHET,
 HANSON C. COXE.

Copies of this patent may be obtained for five cents each, by addressing the "Commissioner of Patents, Washington, D. C."